United States Patent [19]

Carswell

[11] Patent Number: 5,057,543

[45] Date of Patent: Oct. 15, 1991

[54] BLENDS OF ALKYLENE GLYCOLS AND RELATIVELY HIGH EQUIVALENT WEIGHT ACTIVE HYDROGEN COMPOUNDS CONTAINING ADDITIVES

[75] Inventor: Robert Carswell, Lake Jackson, Tex.

[73] Assignee: The Dow Chemical Company, Midland, Mich.

[21] Appl. No.: 398,806

[22] Filed: Aug. 25, 1989

[51] Int. Cl.$^5$ .................. C08G 18/24; C08G 18/14
[52] U.S. Cl. .................... 521/51; 521/137; 521/163
[58] Field of Search ............. 521/51, 105, 137, 163, 521/155; 528/73

[56] References Cited

U.S. PATENT DOCUMENTS

| | | | |
|---|---|---|---|
| 3,753,933 | 8/1973 | Olstowski et al. | 521/170 |
| 4,125,487 | 11/1978 | Olstowski | 521/137 |
| 4,239,857 | 12/1980 | Harper | 521/121 |
| 4,269,945 | 5/1981 | Vanderhider et al. | 521/159 |
| 4,296,212 | 10/1981 | Ewen et al. | 521/163 |
| 4,362,824 | 12/1982 | Dominguez et al. | 521/118 |
| 4,433,067 | 2/1984 | Rice et al. | 521/51 |
| 4,435,349 | 3/1984 | Dominguez et al. | 264/257 |
| 4,444,910 | 4/1984 | Rice et al. | 521/51 |
| 4,485,031 | 11/1984 | Olstowski et al. | 252/182 |
| 4,485,032 | 11/1984 | Olstowski et al. | 252/182 |
| 4,547,478 | 10/1985 | Chang | 502/154 |
| 4,548,919 | 10/1985 | Megna | 502/154 |
| 4,575,518 | 3/1986 | Rasshofer et al. | 521/51 |
| 4,585,803 | 4/1986 | Nelson et al. | 521/105 |
| 4,595,743 | 6/1986 | Laughner et al. | 528/73 |
| 4,673,696 | 6/1987 | Tsai | 521/172 |
| 4,719,247 | 1/1988 | Lin et al. | 521/159 |
| 4,742,091 | 5/1988 | Grigsby, Jr. et al. | 521/163 |
| 4,745,137 | 5/1988 | Thomas et al. | 521/137 |
| 4,751,251 | 6/1988 | Thornsberry | 521/112 |
| 4,751,253 | 6/1988 | Tylenda | 521/114 |
| 4,753,966 | 6/1988 | Haas et al. | 521/51 |
| 4,755,321 | 7/1988 | Moss et al. | 252/182.24 |
| 4,766,172 | 8/1988 | Weber et al. | 524/783 |
| 4,774,263 | 9/1988 | Weber et al. | 521/51 |
| 4,774,264 | 9/1988 | Weber et al. | 521/51 |

FOREIGN PATENT DOCUMENTS

| | | |
|---|---|---|
| 81701 | 6/1985 | European Pat. Off. |
| 260685 | 3/1988 | European Pat. Off. |
| 303105 | 2/1989 | European Pat. Off. |

OTHER PUBLICATIONS

R. C. Mehrotra and V. D. Gupta in *J. Organometallic Chem.* 1965, 4, pp. 145–150.

Wm. J. Considine in *J. Organometallic Chem.* 1965, 5, pp. 263–266.

A. Pauperio and R. N. Santos in *Exploring New Horizons*, 1986, pp. 240–243.

*Primary Examiner*—John Kight, III
*Assistant Examiner*—Shelley A. Wright

[57] ABSTRACT

An active hydrogen compound-alkylene glycol composition comprises components (A) a relatively high equivalent weight material having an average of at least about 1.8 active hydrogen containing groups per molecule and a weight from about 500 to about 5000 per active hydrogen containing group; (B) an alkylene glycol; and (C) a catalytic amount of at least one tin mercaptide; said composition containing at least one compound having at least one N—H containing group. Such compositions are useful in producing polyurethanes. The compositions can generally be stored without substantial loss of activity.

25 Claims, No Drawings

BLENDS OF ALKYLENE GLYCOLS AND RELATIVELY HIGH EQUIVALENT WEIGHT ACTIVE HYDROGEN COMPOUNDS CONTAINING ADDITIVES

BACKGROUND OF THE INVENTION

This invention relates polyurethanes and to compositions of relatively high equivalent weight active hydrogen compounds and alkylene glycols, said compositions containing materials that make the compositions useful in preparing polyurethanes.

In making polyurethanes mixtures of a relatively high equivalent weight active hydrogen compound and a relatively low equivalent weight chain extender compound are reacted with a polyisocyanate. Using alkylene glycols as chain extenders often produces advantageous properties in resulting polyurethanes.

In such glycol-extended active hydrogen compound compositions, amine compounds and other compounds having nitrogen to hydrogen bonds (N—H) are also frequently useful. Amines can be present for a variety of functions. For instance, an amine compound can additionally provide catalysis, chain extension, aid in mold release or other function. Amines useful as chain extenders or cross-linking agents, for instance, are described in U.S. Pat. Nos. 4,218,543; 4,269,945; 4,433,067 and 4,444,910. Use of amines as compatibilizing agents, for instance, is described in U.S. application Ser. Number 935,356, filed Nov. 6, 1986. Use as an active hydrogen component, for instance, is described in U.S. Pat. Nos. 4,719,247 and 4,742,091. Use in an internal mold release composition, for instance, is described in U.S. application Ser. No. 570,141, filed Jan. 12, 1984 to Meyer et al. and in U.S. Pat. No. 4,585,803. Other N—H containing compounds are exemplified by urea compounds such as are used in the teachings of U.S. Pat. Nos. 4,485,031 and 4,485,032.

In active hydrogen compositions containing glycols and amine compounds, however, certain common catalysts for forming polyurethanes such as dialkyl tin dicarboxylates, dialkyl tin thioglycolates, and dialkyl tin dimaleates are often observed to lose activity over time and especially on exposure to heat. Precipitates are often observed in such compositions. Loss of activity and precipitate formation can interfere with subsequent polyurethane formation because activity of the compositions varies with storage time and conditions. Similar problems are also noted when compounds such as ureas having N—H groups are present in place of the amines.

It would, therefore, be desirable to prepare active hydrogen compositions having glycols, compounds having groups with N—H structures and catalysts which do not lose substantial activity in the presence of such compositions.

SUMMARY OF THE INVENTION

In one aspect, the invention is a active hydrogen compound-alkylene glycol composition comprising components:

(A) a relatively high equivalent weight active hydrogen compound having an average of at least about 1.8 active hydrogen containing groups per molecule and an average molecular weight from about 500 to about 5000 per active hydrogen containing group;

(B) an alkylene glycol; and (C) a catalytic amount of at least one tin mercaptide; said composition containing at least one compound having at least one N—H containing group.

In other aspects, the invention includes polyurethane polymers prepared from the compositions of the invention and processes of preparing such polymers.

Compositions of the invention are useful for reacting with polyisocyanates to form polyurethanes. The catalytic activity is advantageously sufficient for use of the compositions in automatic RIM processes without additional catalyst.

DETAILED DESCRIPTION OF THE INVENTION

One component of the composition of this invention is a relatively high equivalent weight active hydrogen compound. The term "relatively high equivalent weight" is used to refer to an equivalent weight (molecular weight per active hydrogen-containing group e.g. —OH, —NH$_2$, —SH) of at least about 500, preferably from about 500 to about 5000. The equivalent weight is preferably from about 700 to about 3000, and more preferably from about 1000 to about 2000. The relatively high equivalent weight active hydrogen compound also advantageously contains an average of at least about 1.8, preferably from about 1.8 to about 6, more preferably about 2 to about 3, nominal active hydrogen containing groups per molecule. The active hydrogen groups are preferably hydroxyl groups, amine groups or mixtures thereof; more preferably hydroxyl groups.

Any suitable organic compound containing at least two active hydrogen containing groups as determined by the Zerewitinoff method may be used as an active hydrogen compound. Active hydrogen compounds are compounds having hydrogen containing functional groups which will react with an isocyanate group. The Zerewitinoff test described by Kohler in the *Journal of the American Chemical Society*, Vol. 49, page 3181 (1927) predicts the tendency of a hydrogen-containing group to react with isocyanates. Suitable active hydrogen compounds are those conventionally employed in the preparation of polyurethanes such as the compounds described in U.S. Pat. No. 4,394,491, particularly in columns 3 through 5 thereof, wherein the compounds are called polyahls, which patent is incorporated herein by reference in its entirety.

Relatively high equivalent weight active hydrogen components most commonly used in polyurethane production are those compounds having at least two hydroxyl groups, which compounds are referred to as polyols. Representatives of the suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II pp 5–6, 198–199 (1964); *Kunststoff-Handbuch*, Vol. VII, Vieweg-Hochtlen, Carl-Hanser-Verlag, Munich, pp. 45–71 (1966); and *Organic Polymer Chemistry* by K. J. Saunders, Chapman and Hall, London, pp. 323–325 (1973); and *Developments in Polyurethanes*, Vol 1, J. M. Buist, ed., Applied Science Publishers (1978) pp. 1–76.

Typical polyols include polyester polyols, polyester amide polyols, and polyether polyols having at least two hydroxyl groups. Polyethers and polyesters having hydroxyl terminated chains are preferred for use as relatively high molecular weight active hydrogen containing compounds in the practice of the invention. Examples of polyols also include hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers, including polythioethers, acetals, including polyacetals.

Polyether polyols are preferably employed in the practice of this invention because they are resistant to hydrolysis. Also, polyether polyols often exhibit incompatibility with alkylene glycols. Preferred among polyether polyols are polyalkylene polyether polyols including the polymerization products of oxiranes or other cyclic ethers such as tetramethylene oxide in the presence of such catalysts as boron trifluoride, potassium hydroxide, triethylamine, tributyl amine and the like, or initiated by water, polyhydric alcohols having from about two to about eight hydroxyl groups, amines and the like. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Sugars such as glucose, sucrose, fructose, maltose and the like as well as compounds derived from phenols such as (4,4'-hydroxyphenyl)2,2-propane, and the like are also suitable polyhydric alcohols for forming polyether polyols useful in the practice of the invention.

The polyether is more preferably a polymer of one or more $C_2-C_8$ cyclic ethers such as ethylene oxide, propylene oxide, butylene oxide, styrene oxide, tetrahydrofuran, and the like. Di- and/or trifunctional polymers of ethylene oxide and/or propylene oxide are preferred. The preferred polyethers are suitably block or random copolymers of propylene and ethylene oxide; but are more preferably block copolymers, most preferably block copolymers having ethylene oxide blocks at the termini of the polyethers such that there are primary hydroxyl groups on the polyethers. Such block copolymers are referred to as ethylene oxide capped polyols. The ethylene oxide caps preferably comprise at least about 10 weight percent of the polyol to produce high reactivity desirable for RIM processes.

Polyamines are also suitable for use in relatively high equivalent weight active hydrogen components in polyurethanes and include polyether polyamines; polyester polyamines; amine-functional polymers such as amine functional acrylates, amine terminated acetal resins, amine terminated urethanes, amine containing polyesters, and the like. Suitable amines include those having terminal primary or secondary aliphatic or aromatic amine groups, including those having terminal aromatic amine functionality such as p-amino phenoxy groups, p-amino m-methyl-N-phenyl carbamate groups and the like. Compositions of amines with polyols are also suitably used as active hydrogen components. When amines are used as at least a portion of the active hydrogen component, polyurea and polyureaurethane linkages are formed. Useful amines include polyoxyalkylene polyamines and cyanoalkylated polyoxyalkylene polyamines having equivalent weights preferably from about 500 to about 10,000 and, more preferably, from about 500 to about 5000.

Among amines, amine-terminated polyethers are preferred for use in the practice of the invention. Amine-terminated polyethers are prepared from the polyether polyols described above by amination thereof. Amination is described in U.S. Pat. Nos. 3,161,682; 3,231,619; 3,236,895; 3,436,359; 3,654,370 which are incorporated herein by reference. For amination, it is generally desirable that the terminal hydroxyl groups in the polyol be essentially all secondary hydroxyl groups for ease of amination. Secondary hydroxyl groups are introduced into a polyol produced from ethylene oxide by capping the polyol with higher alkylene oxides, that is, with alkylene oxides having more than two carbon atoms. Alternatively, secondary hydroxyl groups result from producing a polyol from higher alkylene oxides.

Generally, amination does not result in replacement of all the hydroxyl groups by amine groups. An aminated polyether polyol is selected to have a percentage of amine groups relative to hydroxy groups of from 0 to 100, preferably from about 5 to about 95 percent, depending on the physical properties desired in a resulting polyurethane. The amine groups are generally primary, but secondary amine groups may be formed. Beneficially, the amine-terminated polyols have an average functionality of from about 2 to about 6 amine groups per molecule. In the case of amines, the term "functionality" is used herein to refer to the number of amine groups, whether they be primary or secondary, in the molecule. Advantageously, the amine-terminated polyols have an average equivalent weight of at least about 500, preferably, an average molecular weight per active hydrogen-containing group from about 500 to about 5000, more preferably from about 500 to about 2500. The process of utilizing aminated polyols disclosed in U.S. Pat. Nos. 4,530,941 and 4,444,910 illustrate processes for using such compounds. Those patents are incorporated herein by reference.

The composition also contains, as a chain extender, an alkylene glycol, preferably an $\alpha,\omega$-alkylene glycol. The glycol is preferably present in an amount sufficient to result in loss of activity of a dialkyltin dicarboxylate catalyst in the presence of an amine, more preferably an amount of at least about one part by weight per hundred parts relatively high equivalent weight compounds, most preferably in an amount which is incompatible, in the absence of a compatibilizer, with the relatively high equivalent weight active hydrogen compound at the relative proportions thereof present in the composition. Suitable alkylene glycols include those having from about 2 to about 8, preferably about 2 to about 6, more preferably about 2 to about 4 carbon atoms because glycols with fewer carbon atoms, on reacting with a polyisocyanate, give rise to more crystaline hard segments. Exemplary chain extenders include ethylene glycol, 1,4-butanediol, 1,6-hexamethylene glycol, 1,8-octanediol, and the like. Ethylene glycol and 1,4-butanediol are most preferred.

Although the composition suitably contains any amount of glycol chain extender at which the chain extender and relatively high equivalent weight active hydrogen compound are incompatible in the absence of a stabilizer, the composition preferably contains about 5 to about 60, more preferably about 10 to about 40 parts by weight of chain extender per 100 parts by weight relatively high equivalent weight active hydrogen compound, because vitrification is often observed when there is more than about 40 parts of glycol. It has been found that polyurethanes having particularly desirable properties may be prepared from blends containing an amount of chain extender within the preferred and more preferred ranges.

Any tin dimercaptide which catalyzes the reaction of an active hydrogen group-containing compound and an isocyanate group-containing compound is suitably used in the practice of the invention. Preferably, the tin dimercaptide catalyst is one which does not lose substantial reactivity on storage with a blend of relatively high equivalent weight active hydrogen compound and glycol, said blend containing at least one compound having N—H containing groups. Substantial reactivity loss, for the purposes of this invention is a doubling of the time required to form a solid polymer after being stored for a period of 24 hours at room temperature of 30° C., reactivity being measured by cup gel time which is measured as the time from mixing the active hydrogen component with the polyisocyanate component. Preferably, less than 50%, more preferably less than 25%, most preferably less than 10% of the reactivity present on initial mixing of the catalyst with the glycol and N—H containing composition is lost on standing for a period of 24 hours at a temperature of 30° C.

Preferably, the tin dimercaptide is a dialkyl tin dimercaptide, and more preferably it has a structure represented by Formula I:

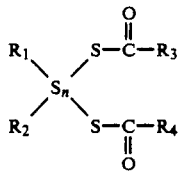

wherein $R_1$, $R_2$, $R_3$ and $R_4$ are alkyl groups, which groups are suitably unbranched, branched, or cyclic. Preferably, $R_1$ and $R_2$ independently have from 1 to about 10, more preferably from about 4 to about 8, most preferably from about 4 to about 8 carbon atoms. Preferably, $R_3$ and $R_4$ independently have from about 4 to about 30, preferably from about 8 to about 20, more preferably from about 10 to about 14, most preferably about 12 carbon atoms. Preferably each $R_1$, $R_2$, $R_3$ and $R_4$ is linear rather than branched alkyl groups. More preferably $R_1$ and $R_2$ have the same number of carbon atoms and $R_3$ and $R_4$ have the same number of carbon atoms.

Exemplary of suitable dialkyltin dimercaptides are dibutyltin dimercaptolaurate, dioctyltin dimercaptolaurate, dimethyltin dimercaptolaurate dibutyltin dimercaptostearate, dioctyltin dimercaptooleate.

The tin mercaptide is preferably present in an amount sufficient to provide sufficient reactivity of the composition in polyurethane formation. Sufficient reactivity varies with the type of polyurethane process employed. In the case of polyurethanes formed in RIM (reaction injection molding) processed, sufficient reactivity is preferably that indicated by formation of a gel which generally rapidly forms a hard polymer within at least about 40 seconds, preferably from about 0.5 to about 25 seconds, more preferably from about 10 to about 20 seconds from mixing of active hydrogen and polyisocyanate components. Preferably there is sufficient catalytic activity to provide sufficient reactivity to permit removal of a molded part from the mold in less than 60 seconds from the time components are injected into the mold (a 60 second demold time). The demold time is preferably from about 1 to about 30 seconds, more preferably from about 1 to about 20 seconds because these are the demold time found useful in automated RIM processes. In the case of integral skin foams, however, longer demold times, preferably less than about 2 minutes, are suitable. Integral skin foams generally have interior densities of from about 75 to about 450, preferably from about 150 to about 350 Kg/m$^3$ (kilograms/cubic meter) whereas, other RIM produced polyurethanes generally have densities of from about 600 to about 1500, preferably from about 900 to about 1200 Kg/m$^3$. Longer demold times such as from about 10 minutes to about 4 hours are sufficient for polyurethane forming compositions used to form such as elastomers which are e.g. cast. The amounts of tin mercaptide generally correspond to from about 0.001 to about 10, preferably from about 0.05 to about 5, more preferably from about 0.05 to about 3 parts by weight tin mercaptide compound based on hundred parts relatively high equivalent weight active hydrogen compound.

Compositions of the invention contain at least one compound having at least one N—H containing group. The compound is preferably a primary or secondary amine, more preferably a monoamine, but is suitably also any other compound having an N—H containing group, for instance a urea or thiourea compound the use of which is taught in U.S. Pat. Nos. 4,485,031 and 4,485,032 and U.S. application Ser. Nos. 398,802, filed Aug. 25, 1989, now allowed, and U.S. Pat. No. 4,981,877.

More preferably, the compound or compounds having N—H groups are ones which compatibilize the glycol in the active hydrogen containing composition. The term "compatibilize" is used herein to denote that the composition remains in a single phase for at least 10 days of storage at a temperature of at least about 20° C.

The N—H structure is optionally present in relatively high equivalent weight compounds present in compositions of the invention. Preferably, N—H containing compounds different from the relatively high equivalent weight compounds are present. Among other amines preferably used as N—H containing compounds are those which provide catalysis, chain extension, aid in mold release or other function. Exemplary of amine compounds useful as chain extenders or cross-linking agents, for instance, are described in U.S. Pat. Nos. 4,269,945; 4,433,067 and 4,444,910 which are incorporated by reference in their entireties. Use of an amine is especially preferred when there are more than about 10 parts by weight of glycol per hundred parts by weight relatively high equivalent weight compound and when a flexural modulus of at least about 5,000 psi is desired in a polurethane prepared from the composition. Use as a compatibilizing agent, for instance, is described in U.S. application Ser. No. 935,356, filed Nov. 26, 1986, which is incorporated by reference in its entirety. Use as an active hydrogen component, for instance, is described in U.S. Pat. Nos. 4,719,247 and 4,742,091 which are incorporated by reference in their entireties. Use in an internal mold release composition, for instance, is described in U.S. application Ser. No. 570,141, filed Jan. 12, 1984 to Meyer et al. or in U.S. Pat. No. 4,585,803 (which patent is incorporated by reference in its entirety).

Suitable amines which can be employed herein as a component in the composition of the invention include any aliphatic, cycloaliphatic, or aromatic compound containing at least one primary or secondary amine group. The amines are, optionally, inertly substituted, that is, substituted with groups which do not undesirably interfere with the reactions of the amine group. Inert substitution includes, for instance, alkyl groups, cycloalkyl groups, aryl groups, arylalkyl groups, nitro groups, sulfate groups, sulfone groups, ether groups, hydroxyl groups, urethane groups, urea groups, and the like. Amines having alkyl, aryl, cycloalkyl, arylalkyl, ether, or hydroxyl groups are preferred.

Prefered amines include unsubstituted or ether-substituted aliphatic or cycloaliphatic primary or secondary mono-amine compounds; hydroxyl amines, including alkyl diethanolamines, diethanolamine and dialkyl hydroxyl amines; and low equivalent weight aliphatic and aromatic amine active hydrogen containing compounds, such as amine terminated polyethers of less than about 500, preferably from about 200 to about 500 molecular weight, hexamethylene diamine, diethylenetriamine, and hydrocarbyl substituted aromatic amines such as, for example, diethylenetoluenediamine. A unsubstituted or ether-substituted aliphatic or cycloaliphatic primary mono-amine compound preferably contains from about 4 to about 8 carbon atoms. An unsubstituted or ether-substituted aliphatic or cycloaliphatic secondary mono-amine compound preferably contains from about 6 to about 12 carbon atoms. An alkyl diethanol amine preferably has an alkyl group containing from about 2 to about 8 carbon atoms. A dialkyl hydroxyl amine preferably contains about 4 to about 10 carbon atoms. In a trialkylamine, each alkyl group preferably has from about 2 to about 4 carbon atoms. Amines having these ranges of carbon atoms are preferred because these amines are effective compatibilizers. Amines described as useful with internal mold release agents in the copending application of Meyer et al. filed Jan. 12, 1984, Ser. No. 570,141, incorporated herein by reference in its entirety, are particularly preferred because they are effective in achieving solutions of the internal mold release agents.

Suitable amines include, for example, oleyl amine, coco amine, tall oil amine, ethanolamine, diethyltriamine, ethylenediamine, propanolamine, aniline, mixtures thereof and the like. Other exemplary amines include n-butylamine, amylamine, n-hexylamine, n-octylamine, sec-butylamine, 1-amino-2-ethoxyethane, 1-amino-1-methyl hexane, cyclohexylamine, di-n-propylamine, ethylpropylamine, di-n-butylamine, di-n-hexylamine, di-sec-butylamine, ethyldiethanolamine, n-propyldiethanolamine, n-butyldiethanolamine, n-hexyldiethanolamine, diethylhydroxylamine, di-n-propylhydroxylamine, di-n-butylhydroxylamine, triethylamine, tri(n-propyl)amine, tri(n-butyl)amine, ethyl di(n-propyl)amine, diethanolamine and the like. Suitable tertiary amines include triethylenediamine, N-methyl morpholine, N-ethyl morpholine, diethylethanolamine, N-coco morpholine, amino ethyl piperazine, 1-methyl-4-dimethylaminoethyl piperazine, 3-methoxy-N-dimethylpropylamine, N,N-diethyl-3-diethylaminopropylamine, dimethylbenzyl amine and the like. Particularly suitable amines include aminated polyoxyalkylene glycols, hexamethylene diamine, diethylene triamine; and hydrocarbyl substituted aromatic amines such as diethylene toluene diamine.

The amount of amine present is not critical to this invention, but is advantageously determined by the purpose served by the amine in a given blend of alkylene glycol and relatively high equivalent weight active hydrogen compound. For instance, there is sufficient amine to compatibilize the polyether polyol and alkylene glycol according the the teachings of U.S. application Ser. No. 935,356, filed Nov. 26, 1986, or to compatibilize a mold release agent according the the teachings of U.S. application Ser. No. Meyer et al. filed Jan. 12, 1984, Ser. No. 570,141 or U.S. Pat. No. 4,585,803. The invention is most useful in compositions containing sufficient amine to result in loss of activity of a tin-containing catalyst for the formation of polyurethanes. Preferably, at least about 0.1, more preferably about 0.05 to about 4, most preferably about 0.2 to about 1 part of amine is used per part of alkylene glycol chain extender because these amounts of amine aid in achieving compatibility of glycols in active hydrogen compounds using amounts of urea insufficient to result in gels. Most preferably, the composition contains about 0.5 to about 20, even more preferably from about 1 to about 20 parts of the amine per 100 parts of relatively high equivalent weight active hydrogen compound because these amounts of amine are effective in preparing solutions of transition metal carboxylates.

Compositions of this invention are conveniently prepared by any admixing of the relatively high equivalent weight active hydrogen compound, glycol chain extender, N—H containing material and tin mercaptide that results in a homogeneous composition. Preferably, a first admixture of the N—H containing material and the glycol chain extender is formed, advantageously by shaking or stirring the materials together, advantageously at about room temperature or at sufficiently higher temperature to form a solution when dissolution is incomplete at room temperature. A second admixture of the relatively high equivalent weight active hydrogen compound and the tin mercaptide is formed, advantageously by mixing them at a temperature of at least about 25° C. until there is no visible evidence of two phases, preferably for about 30 minutes. The two admixtures are, then, combined with the relatively high equivalent weight compound and stirred using mild heat, e.g. about 35° C., if necessary to achieve a single phase.

In addition to the foregoing components, other additives which are useful in preparing polyurethanes may be present in the stabilized composition. Among these additives are catalysts, blowing agents, surfactants, crosslinkers, antioxidants, UV absorbers, preservatives, colorants, particulate fillers, reinforcing fibers, antistatic agents, internal mold release agents and the like.

Suitable blowing agents, which are optionally employed herein, include water, halogenated methanes such as methylene chloride, dichlorodifluoromethane, trifluoromonochloromethane and the like, the so-called "azo" blowing agents, finely divided solids and the like. However, in preparing noncellular or microcellular polyurethanes the use of these blowing agents is not preferred. In making microcellular polyurethanes having a density from about 600 to about 1500 kg/m$^3$, it is preferred to reduce density by dissolving or dispersing a gas such as dry air or nitrogen into the compatibilized composition prior to its reaction with a polyisocyanate.

Suitable surfactants include silicone surfactants and fatty acid salts, with the silicone surfactants being preferred. Such surfactants are advantageously employed in an amount from about 0.01 to about 2 parts per 100 parts by weight relatively high equivalent weight active hydrogen compound.

Suitable fillers and colorants include calcium carbonate, alumina trihydrate, carbon black, titanium dioxide, iron oxide, flaked or milled glass, mica, talc and the like.

Suitable fibers include glass fibers, polyester fibers, graphite fibers, metallic fibers and the like.

While additional catalysts for forming polyurethanes are, optionally, present in addition to the tin mercaptide in the compositions of the invention, additional catalysts are advantageously not necessary and, preferably, are not used. When additional catalysts are used, they are preferably catalysts which do not exhibit a substantial loss of activity when stored with other components of the compositions for times suitable for particular applications. More preferably, the catalysts lose less than about 50, most preferably less than about 25 percent of their reactivity (a measured by gel time) when stored with other components of a composition of the invention for a period of at least about 6 months at a temperature of at least about room temperature (e.g. 25° C.). More preferably, tetravalent organometallic tin-containing catalysts which lose reactivity in the presence of an amine, such as dialkyl tin dicarboxylates, dialkyl tin thioglycolates, tetra-alkyl tins and tin oxides, particularly stannous oxide, are present in amounts insufficient to substantially increase the rate of polyurethane formation, (as measured by gel time). A increase of less than about 10 percent in gel time is considered insubstantial. Most preferably, less than about 0.001 weight percent tetravalent tin catalyst which loses reactivity in the presence of an amine is present in a composition of the invention. Specific catalysts are within the skill in the art and include those catalysts described, for instance, in U.S. Pat. No. 4,269,945, particularly column 4, line 46 through column 5, line 25, which is incorporated herein by reference.

Active hydrogen component compositions of this invention are reacted with at least one polyisocyanate component to form a polyurethane. Both aliphatic and aromatic diisocyanates are useful for this purpose. Suitable aromatic diisocyanates include, for example, m-phenylene diisocyanate, p-phenylene diisocyanate, 2,4- and/or 2,6-toluene diisocyanate (TDI), naphthylene-1,5-diisocyanate, 1-methoxyphenyl-2,4-diisocyanate, 4,4'-biphenylenediisocyanate, 3,3'-dimethoxy-4,4'-biphenyldiisocyanate, 2,4'- and/or 4,4'-diphenylmethanediisocyanate (MDI) and derivatives thereof including polymeric derivatives. Preferred among the aromatic polyisocyanates are the isomers and derivatives of TDI and MDI.

Exemplary aliphatic polyisocyanates include isophorone diisocyanate, cyclohexane diisocyanate, hydrogenated diphenylmethanediisocyanate ($H_{12}MDI$), 1,6-hexamethylenediisocyante and the like. Of these, hexamethylenediisocyanate and $H_{12}MDI$ are most preferred.

Biuret, urethane, thiourea, uretonimine and/or carbodiimide containing derivatives, including prepolymers, of the foregoing polyisocyanates are also suitable.

In preparing the polyurethane, the polyisocyanate is employed in an amount to provide about 0.9 to about 1.5, preferably about 1.0 to about 1.25, more preferably about 1.0 to about 1.05, isocyanate groups per active hydrogen-containing group present in the reaction mixture. These ratios of isocyanate groups to active hydrogen-containing group are referred to herein as isocyanate index. Lesser amounts of polyisocyanate produce an inadequately cured polymer whereas greater amounts thereof tend to form undesirable crosslinking.

A composition of the invention is advantageously reacted with the polyisocyanate by forming a mixture therewith and introducing the mixture into a suitable mold for curing. Conventional casting techniques may be used, wherein the components are mixed and poured into the mold, where they cure upon heating. However, especially when more reactive components are used, it is preferred to conduct the reaction using a reaction injection molding (RIM) process. In such process, the components are subjected to high shear impingement mixing and immediately injected into a closed mold where curing takes place. In either the conventional casting or RIM techniques, in-mold curing takes place at least to an extent that the part retains its shape during demolding and subsequent handling. However, complete curing, i.e., curing to a point at which no additional discernable reaction occurs, may take place either in the mold or in a post-curing step which is conducted after demolding. In the practice of the invention, the postcuring step is preferably avoided. If needed, postcuring of the polyurethane is advantageously conducted at a temperature of about 250° F., but preferably less than about 350° F., for a period of about 1 minute to about 24 hours, preferably about 1 minute to about 3 hours because postcuring for these times produces polyurethanes having relatively better physical properties.

While the invention is useful in forming any polyurethane, particularly a molded polyurethane, it is particularly useful in the preparation of elastomeric polyurethanes using automated RIM processes. The invention is particularly important in producing high modulus RIM polyurethanes, preferably those having a flexural modulus greater than about 2,000 psi, more preferably greater than 5,000 psi, most preferably greater than about 10,000 psi, even more preferably greater than about 20,000 psi, as measured by the procedure of ASTM D-747-86. Polyurethanes are suitably used to prepare automobile parts such as fascia, molded window gaskets, bumpers, stearing wheels and the like, as well as for non-automotive uses such as beer barrel skirts, shoe soles and the like.

The following examples are provided to illustrate the invention but are not intended to limit the scope thereof. All parts and percentages are by weight unless otherwise indicated. Examples (Ex.) of the invention are designated numerically, while comparative samples (C.S.), which are not examples of the invention, are designated alphabetically.

EXAMPLE 1

Rim Process Using Formulation Containing Thiourea, Ethylene Glycol, Polyol, Amine, and Zinc Laurate and a Tin Mercaptide A first admixture is prepared by stirring 93 parts by weight of a 5000 molecular weight, glycerine initiated poly(propylene oxide) which is ethylene oxide capped (hereinafter Polyol A) into a mixture of 10 parts of ethylene glycol and 2 parts of (unsubstituted) urea for about 10 minutes at 25° C. 150 grams of dibutyl tin dilauryl mercaptide commercially available from Witco Corp. under the trade designation UL-1 (Catalyst A) is mixed with the first admixture. A second admixture is prepared by stirring 7 parts by weight of a difunctional, amine terminated poly(propylene oxide) having an average molecular weight of about 400, commercially available from Texaco Chemical Corp. under the trade designation Jeffamine®D400 (hereinafter Amine A) and 2 parts by weight of zinc laurate for about 30 minutes at a temperature of about 60° C. The first and second admixtures are combined by putting both into the B-side of an Admiral 2000 RIM machine and mixing by stirring and circulation. Carbodiimide-modified diphenylmethanediisocyanate having an average equivalent weight of about 143 (hereinafter Isocyanate A) is placed in the A-side of the machine. The machine is calibrated to a 1.03 index (ratio of isocyanate groups to hydroxyl groups) by adjusting the machine to deliver the contents of the B- and A-sides at a weight ratio of 1.769 (B/A ratio).

The components are maintained at a temperature of about 80° F. A mixing pressure of about 2000 pounds per square inch (psi) is used. The machine is adjusted for a shot time of about 1.3 seconds.

A plaque mold having an upper and a lower plate is used. The lower plate is stripped and polished before a very light coat of wax is applied. This plate is is buffed after about each fourth plaque is produced. The upper plate is waxed initially, but not additionally treated during the course of producing 20 plaques, all of which released easily from the mold.

The first 4 plaques are produced at a mold temperature of about 170° F. Then the mold temperature is reduced to about 160° F. Demold times are 15 seconds at 170° F. and 20 seconds at 160° F.

EXAMPLES 2-4

Rim Process Using Formulation Containing Thiourea, Ethylene Glycol, Polyol, Amine, and Zinc Laurate and a Tin Mercaptide The procedure of Example 1 is repeated for the following formulations with the differences indicated in Table I:

TABLE I

|  | Ex.1 | Ex. 2 | Ex. 3 | Ex. 4 |
| --- | --- | --- | --- | --- |
| Polyol A* | 93 | 93 | 93 | 93 |
| Amine A* | 7 | 7 | 7 | 7 |
| Catalyst A | 0.25 wt. % | 0.25 wt. % | 0.25 wt. % | 0.25 wt. % |
| ethylene glycol* | 10 | 10 | 10 | 10 |
| urea* | 2 | 0 | 0 | 0 |
| zinc laurate* | 2 | 0 | 2 | 2 |
| Isocyanate A B/A ratio (weight) | 1.769 | 0 | 0 | 1.7 |
| Isocyanate B B/A ratio (weight) | 0 | 1.102 | 1.102 | 0 |
| A side temperature (°F.) | 80 | 110 | 110 | 100 |
| B side temperature (°F.) | 80 | 130 | 130 | 100 |
| mold temperature (°F.) | 170/160 | 160/165 | 160/165 | 165 |
| shot time (sec.) | 1.3 | 1.5 | 1.5 | 1.55 |
| demold time (sec.) | 15/20 at 170° F. and 160° F. respectively | 25 | 25 | 30 |
| index | 1.03 | 1.03 | 1.03 | 1.03 |
| Specific gravity[1] | 0.8959 | 0.889 | 0.911 | 0.878 |
| Flexural modulus[2] (psi) | 5106 | 5885 | 6931 | 4387 |
| Tensile strength[3] (psi) | 1999 | 1086 | 1276 | 1432 |
| Die C tear[4] (pli) | 200 | 173 | 186 | 179 |
| Hardness[6] Shore A | 86 | 76 | 77 | 81 |

*in parts by weight in B side
[1] as measured by the procedure of ASTM D-792-86.
[2] as measured in pounds per square inch (psi) by the procedures of ASTM D-747-86.
[3] as measured in psi by the procedures of ASTM D-638-84.
[4] as measured in pounds per linear inch (pli) by the procedures of ASTM D-624-86.
[5] as measured in % by the procedures in ASTM D-638-84.
[6] as measured in Shore A by the procedures of ASTM D-2240-86.

Isocyanate B is a soft segment methylene diphenyldiisocyanate prepolymer of having an average equivalent weight of about 235 commercially available from The Dow Chemical Company under the trade designation Code 1287.

The data in Table I shows that compositions of the invention are useful in making polymers having useful properties and that the compositions maintain reactivity at the component temperatures used in these examples.

EXAMPLES 5-7

Gel Times of a Formulation Containing Ethylene Glycol, Polyol, Amine, and a Tin Mercaptide A first admixture is prepared by stirring 100 parts by weight of Polyol A with 15 parts of ethylene glycol and 3.8 parts of cyclohexylamine at room temperature, about 25° C. until completely mixed without signs of separation or striation. A 60 g portion of the admixture is then mixed with 0.25 g of Catalyst A. The resulting mixture is shaken at room temperature and shows no precipitate. The mixture is then mixed with 58 g of a hard segment methylene diphenyl diisocyanate prepolymer having an average equivalent weight of about 179, commercially available from The Dow Chemical Company under the trade name Isonate 181 to form, for Example 5, a polyurethane-forming mixture of index 1.03. The gel time of Example 5, is measured as 13.7 seconds from initial mixing until formation of a polymer too solid to stir manually.

Additional portions of mixtures of the same polyol, glycol, amine and catalyst in the same proportions are placed in an oven maintained at 130° F. After 24 hours in the oven, the mixture remains clear with no precipitate. For Example 6, a polyurethane-forming mixture is prepared as in Example 5 and has a gel time of 13.9 seconds.

For Example 7, a polyurethane-forming mixture is prepared as in Example 5 but using a portion of the mixture stored for 10 days at 130° F. The gel time is 12.3 seconds.

In comparison, polyurethane-forming mixtures having the same composition but having dialkyl tin dicarboxylates, dialkyl tin dimaleates or dialkyl tin dithioglycolates in place of Catalyst A exhibit greater losses of activity as measured by gel times after storage at 130° F. than do compositions containing the tin mercaptide, Catalyst A.

What is claimed is:
1. A active hydrogen compound-alkylene glycol composition comprising components:
(A) a relatively high equivalent weight active hydrogen compound having an average of at least about 1.8 active hydrogen containing groups per molecule and an average molecular weight of from about 500 to about 5000 per active hydrogen containing group;

(B) an alkylene glycol; and (C) a catalytic amount of at least one tin mercaptide; said composition containing at least one compound having at least one N—H containing group.

2. The composition of claim 1 wherein there is at least about one part by weight of component (B) per hundred parts by weight (A).

3. The composition of claim 2 wherein the tin mercaptide is a dialkyl tin dimercaptide.

4. The composition of claim 3 wherein the dialkyl tin dimercaptide has a structure represented by Formula I:

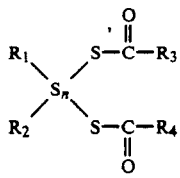

wherein $R_1$, $R_2$, $R_3$ and $R_4$ are alkyl groups or acyl groups (—C(=O)—$R_5$).

5. The composition of claim 4 wherein $R_1$ and $R_2$ independently have from 1 to about 10 carbon atoms and $R_3$ and $R_4$ independently have from about 4 to about 30 carbon atoms.

6. The composition of claim 5 wherein each $R_1$, $R_2$, $R_3$ and $R_4$ are linear rather than branched alkyl groups.

7. The composition of claim 5 wherein the amount of tin mercaptide is from about 0.05 to about 5 parts by weight based on weight of relatively high equivalent weight active hydrogen compound.

8. The composition of claim 4 wherein component A is at least one amine terminated polyether polyol.

9. The composition of claim 8 containing an amine compound different from amine compounds present in component (A).

10. The composition of claim 9 wherein the amine is an unsubstituted or ether-substituted aliphatic or cycloaliphatic primary or secondary mono-amine compound; a trialkyl amine; a hydroxyl amine; a tertiary amine an amine terminated polyether having a molecular weight less than about 500, hexamethylene diamine, diethylenetriamine; a hydrocarbyl substituted aromatic amine; or a mixture thereof.

11. The composition of claim 10 wherein the amount of tin mercaptide is from about 0.05 to about 5 parts by weight and the amount of alkylene glycol is from about 10 to about 40 parts by weight, both per 100 parts by weight of component (A); and the weight ratio of amine to glycol is from about 0.05 to about 4.

12. The composition of claim 4 wherein component (A) is the only amine group-containing material.

13. The composition of claim 4 wherein component (A) is at least one polyether polyol and wherein the composition contains an amine.

14. The composition of claim 13 wherein the amine is an unsubstituted or ether-substituted aliphatic or cycloaliphatic primary or secondary mono-amine compound; a trialkyl amine; a hydroxyl amine; a tertiary amine; an amine terminated polyether having a molecular weight less than about 500, hexamethylene diamine, diethylenetriamine; a hydrocarbyl substituted aromatic amine; or a mixture thereof.

15. The composition of claim 14 wherein the amount of tin mercaptide is from about 0.05 to about 5 parts by weight and the amount of alkylene glycol is from about 10 to about 40 parts by weight, both per 100 parts by weight of component (A); and the weight ratio of amine to glycol is from about 0.05 to about 4.

16. The composition of claim 9 wherein the compound containing at least one N—H containing group is at least one urea or thiourea compound.

17. The composition of claim 1 which loses less than about 50 percent of its reactivity in forming polyurethanes when the composition is stored for a period of at least about 24 hours at about 30° C.

18. A polyurethane polymer which is the reaction product of a polyisocyanate and the polyetheralkylene glycol composition of claim 2.

19. The polyurethane polymer of claim 18 wherein the polyurethane polymer is formed in a reaction injection molding process.

20. The polyurethane polymer of claim 19 wherein the polymer has a demold time of less than about 60 seconds.

21. The polyurethane polymer of claim 20 wherein the polymer has a demold time of from about 1 to about 30 seconds.

22. The polyurethane polymer of claim 20 wherein the polymer has a flexural modulus of at least about 5,000 psi.

23. The polyurethane polymer of claim 18 wherein the polymer has a density from about 75 to about 450 kg/m³ and has a demold time of less than about 2 minutes.

24. The polyurethane polymer of claim 18 wherein the polymer is an integral skin foam and has a demold time of less than about 2 minutes.

25. The polyurethane polymer of claim 18 wherein the polymer is an integral skin foam and in the form of a shoe sole or shoe inner sole.

* * * * *